A. WRIGHT & A. F. TEW.
Crow and Tamping-Bars.
No. 138,599. Patented May 6, 1873.
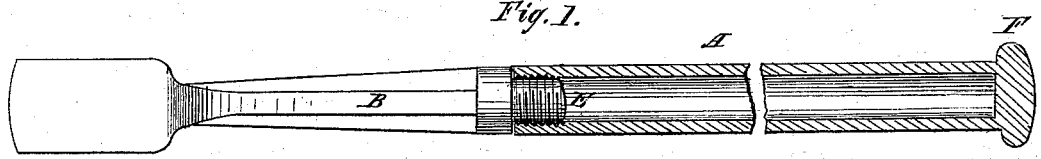
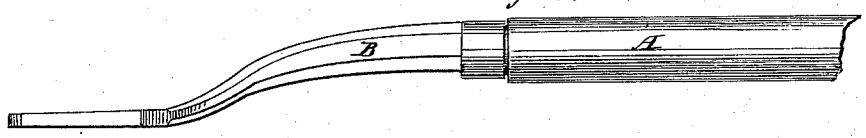
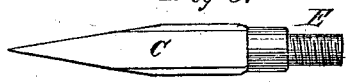
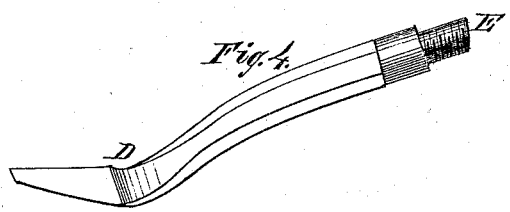
Witnesses:
O. C. Dieterich
Feuguist
Inventor:
A. Wright
A. F. Tew
per
Attorneys.

UNITED STATES PATENT OFFICE.

ALLEN WRIGHT AND ALVIN F. TEW, OF WESTFIELD, NEW YORK.

IMPROVEMENT IN CROW AND TAMPING BARS.

Specification forming part of Letters Patent No. 138,599, dated May 6, 1873; application filed November 16, 1872.

*To all whom it may concern:*

Be it known that we, ALLEN WRIGHT and ALVIN F. TEW, of Westfield, in the county of Chautauqua and State of New York, have invented a new and Improved Crow and Tamping Bar, of which the following is a specification:

Our invention consists of the handle part of a crow, mill, tamping, or other hand-bar, made of tubing, with the end for work made of steel, and detachably connected to the handle part, so that a point for tamping, or a claw, or other kind of point, can be substituted for the claw-point. The object is to enable us to make the handle part as large as is required for filling the hand of the workman to the extent naturally required for the greatest convenience without being too heavy, which they would if made solid and as large as required.

Figure 1 is a sectional elevation of the handle part of a bar with a tamping attachment. Fig. 2 is a side elevation of Fig. 1. Fig. 3 is a side elevation of a crow-bar attachment, and Fig. 4 is a side elevation of a claw-bar attachment.

Similar letters of reference indicate corresponding parts.

A is the tubular handle part. B is the tamping attachment. C is a crow-bar attachment; and D is a claw attachment, any one of which may be used with the handle, being provided with a screw-shank, E, for screwing into the end of the handle. A head, F, is fastened on the upper end of the handle to fill up the hole, also for the ordinary purposes of the head of a bar. It may be permanently attached as here shown, or it may screw on detachably if preferred.

Having thus described our invention, we claim as new and desire to secure by Letters Patent, as a new article of manufacture—

A crow, claw, or tamping bar, with a tubular handle, A, the two being detachably connected together, substantially as specified.

ALLEN WRIGHT.
ALVIN F. TEW.

Witnesses:
EPHRAIM HEWITT,
R. G. WRIGHT.